United States Patent
Parker et al.

(10) Patent No.: US 7,006,820 B1
(45) Date of Patent: Feb. 28, 2006

(54) METHOD FOR DETERMINING PREFERRED CONDITIONS FOR WIRELESS PROGRAMMING OF MOBILE DEVICES

(75) Inventors: Tana Parker, Hayward, CA (US); Ken Nguyen, Mountain View, CA (US); James D. Fay, Palo Alto, CA (US)

(73) Assignee: At Road, Inc., Fremont, CA (US)

( * ) Notice: Subject to any disclaimer, the term of this patent is extended or adjusted under 35 U.S.C. 154(b) by 543 days.

(21) Appl. No.: 09/972,782

(22) Filed: Oct. 5, 2001

(51) Int. Cl.
   *H04M 3/00* (2006.01)
   *H04M 3/42* (2006.01)
   *H04Q 7/20* (2006.01)
   *G06F 15/16* (2006.01)

(52) U.S. Cl. .............. 455/419; 455/418; 455/414.1; 455/414.2; 455/420; 455/423; 455/424; 455/425; 709/203

(58) Field of Classification Search ........ 455/418–421, 455/404.2, 410, 456.1–456.3, 456.6, 459, 455/457, 412.1–412.2, 404.1, 423–425, 432.1, 455/432.2, 456.5, 466, 550.1, 556.1, 569.1, 455/569.2; 709/202–203, 217, 219; 340/870.08, 340/991, 993, 825.22, 825.69, 825.72
See application file for complete search history.

(56) References Cited

U.S. PATENT DOCUMENTS

| | | | |
|---|---|---|---|
| 5,301,232 A | 4/1994 | Mulford | |
| 5,343,494 A | 8/1994 | Averst et al. | |
| 5,381,138 A | 1/1995 | Stair et al. | |
| 5,754,954 A | 5/1998 | Cannon et al. | |
| 5,974,328 A * | 10/1999 | Lee et al. | 455/456.3 |
| 5,978,669 A * | 11/1999 | Sanmugam | 455/410 |
| 6,088,457 A | 7/2000 | Parkinson et al. | |
| 6,097,958 A * | 8/2000 | Bergen | 455/456.2 |
| 6,122,503 A | 9/2000 | Daly | |
| 6,167,253 A * | 12/2000 | Farris et al. | 455/412.2 |
| 6,195,546 B1 | 2/2001 | Leung et al. | |
| 6,215,994 B1 | 4/2001 | Schmidt et al. | |
| 6,308,061 B1 * | 10/2001 | Criss et al. | 455/418 |
| 6,549,770 B1 * | 4/2003 | Marran | 455/419 |
| 6,718,177 B1 * | 4/2004 | Comer et al. | 455/458 |

* cited by examiner

*Primary Examiner*—William Trost
*Assistant Examiner*—Meless Zewdu
(74) *Attorney, Agent, or Firm*—Swernofsky Law Group PC (57) ABSTRACT

The invention provides a method and system capable of automatically selecting conditions and parameters (such as scheduled times) for wireless programming of selected mobile devices, and automatically performing wireless programming of those mobile devices using the selected conditions and parameters. A server device examines a history of a selected target mobile device, and in response to that history, predicts a "good" set of conditions and parameters for programming the mobile device. The server device confirms that the mobile device is ready for wireless programming using the selected conditions and parameters (such as the scheduled time), buffers the programming download at the mobile device, and directs the mobile device to inject the programming download into its program memory. The server device is capable of optionally informing a customer associated with the mobile device before or after performing automated wireless programming (or both).

52 Claims, 3 Drawing Sheets

METHOD FOR DETERMINING PREFERRED CONDITIONS FOR WIRELESS PROGRAMMING OF MOBILE DEVICES

BACKGROUND OF THE INVENTION

1. Field of the Invention

The invention relates to wireless programming of mobile devices.

2. Related Art

Using wireless communication, mobile devices can communicate with an application server while continuing to move about. This allows the application server to provide information about the mobile devices to a customer, and to provide information from the customer to the mobile devices, all without any substantial need for restricting the mobility of those mobile devices. For example, one known application includes a system that tracks locations of such mobile devices and reports those locations to the customer.

In known applications, each mobile device periodically provides application information to the application server (such as, for a tracking application, the location of the mobile device) along with information identifying the specific mobile device (such as a unique identifier or electronic serial number). The choice of particular information, and the frequency of its delivery, provided by the mobile device might vary substantially depending on the nature of the application. Known systems include a processing element in the mobile device, which under the control of program and data memory, can perform tasks required by any specific application for which appropriate instructions have been recorded in that memory.

One known problem is that of altering the instructions or parameters re-corded in the memory of the mobile device. This is desirable from time to time, such as to update the instructions in the mobile device with new features or to update the instructions in the mobile device with new instructions with corrections to known bugs. Because it is generally desirable, for ease of administration and for consistency, for substantially all mobile devices to operate using the same instructions and parameters, desired times for updates to the instructions or parameters in the mobile device might be frequent. Physically replacing the memory, or physically traveling to the mobile device to program the memory, are untenably costly. Accordingly, known systems attempt to record instructions in the memory by sending information embodying those instructions using wireless communication. While known techniques generally achieve the goal of downloading new program information to the mobile device, they are subject to several drawbacks.

First, because it can take a substantial amount of time to download a new program for the mobile device, it is generally necessary to agree with a customer associated with the mobile device on a scheduled time for performing wireless programming. Otherwise, the mobile device might be busy, might not be in an area with good wireless reception, or might be used for normal operation during the time needed for wireless programming. This drawback is exacerbated by the time, effort, and expense of contacting the customer, agreeing on a wireless programming schedule, and assuring that the mobile devices (if there are many, and there often are) are in fact ready for wireless programming at the scheduled times.

Second, also because it can take a substantial amount of time to download a new program for the mobile device, it is generally necessary for the mobile device to be quiescent for the entire time needed for performing wireless programming. Otherwise, the downloaded program for the mobile device might fail to be received and injected into the mobile device's memory properly, thus causing either (1) the mobile device to work improperly after wireless programming, (2) the mobile device to require on-site programming to repair the improper download, or both.

Accordingly, it would be advantageous to provide an improved technique for scheduling and performing wireless programming.

SUMMARY OF THE INVENTION

The invention provides a method and system capable of automatically scheduling times for wireless programming of selected mobile devices, and automatically performing wireless programming of those mobile devices at the scheduled times. A server device examines a history of a selected target mobile device (or a selected substitute for the target mobile device, such as a similar device, another device in a related pool of such devices, another device used by the same owner, or another device used in the same industry or for the same purpose), and in response to that history, predicts a "good" set of times for programming the mobile device. The server device confirms that the mobile device is ready for wireless programming at the predicted time, buffers the programming download at the mobile device, and directs the mobile device to inject the programming download into its program memory. The programming download might include new operating system firmware or software, new application software, new data, or a diagnostic program for collecting information; there is no particular requirement that the programming download is persistently retained at the client after its purpose is served. In preferred embodiments, the server device is capable of optionally informing a customer associated with the mobile device before or after performing automated wireless programming (or both).

INCORPORATED DISCLOSURES

Inventions described herein can be used in conjunction with technology de-scribed in the following documents:

U.S. patent application Ser. No. 09/698,888 (Express Mail Mailing No. EL 487 707 095 US), filed Oct. 27, 2000, in the name of Kulbir SANDHU and Rodric FAN, titled "System and Method for Just-in-time Vehicle Maintenance", and ap-plications claiming priority therefrom.

These documents are hereby incorporated by reference as if fully set forth herein, and are sometimes referred to herein as the "incorporated disclosures".

DETAILED DESCRIPTION OF THE PREFERRED EMBODIMENT

In the description herein, a preferred embodiment of the invention is de-scribed, including preferred process steps and data structures. Those skilled in the art would realize, after perusal of this application, that embodiments of the invention might be implemented using a variety of other techniques not specifically described, without undue experimentation or further invention, and that such other techniques would be within the scope and spirit of the invention.

Lexicography

The following terms relate or refer to aspects of the invention or its embodiments. The general meaning of each of these terms is intended to be illustrative and in no way limiting.

activity information—In general, this refers to information regarding the recent operation of the mobile device, such as for example historical or operational data regarding the position and status of the mobile device and its associated vehicle. Although the invention is described with regard to wireless programming of mobile bile devices that are disposed in vehicles, there is no particular requirement that mobile devices are so limited. Moreover, there is no particular requirement that activity information must refer to the target device; it might refer to a selected substitute for the target mobile device, such as a similar device, another device in a related pool of such devices, another device used by the same owner, or another device used in the same industry or for the same purpose.

buffer and inject (for control information)—In general, this refers to the mo-bile device receiving control information from the server device, temporarily storing that control information in a buffer, and then moving that control information from the buffer to its program and data memory. In a preferred embodiment, the control information is buffered while it is being received, then injected into the program and data memory in an atomic operation. However, there is no particular requirement for using a separate buffer, and in alternative embodiments, wireless programming can include direct transfer into a control memory for the mobile device.

control information—In general, this refers to programming instructions (such as for example firmware or applications for use by the mobile device), data for use with those programming instructions, or other information (such as for example operational parameters) for use by the mobile device. As noted herein, the concept of "control information" is broad, and is intended to include at least the following: firmware program instructions, firmware parameter values, operating system program instructions, operating system parameter values, application program instructions, application parameter values, commands or requests to be received and acted upon by a program at the mobile device, tests to be performed at or by the mobile device, and the like.

customer—In general, this refers to an individual or other entity associated with the mobile device and responsible for (or using) the vehicle in which the mobile device is disposed. In a preferred embodiment, the customer generally includes a dispatch operator or other person responsible for directing the mobile device's ve-hide to a selected location (such as a parking garage) at selected times. However, in alternative embodiments, the customer might have a different relationship with the vehicle or the mobile device, such as a fleet operator or a vehicle lessor.

download—In general, this refers to a process of sending control information from the server device to the mobile device. In a preferred embodiment, the download operation might include feedback from the mobile device back to the server device, as for example in communication protocols where the receiver sends acknowledgement messages (or other responsive messages) from time to time.

mobile device—In general, this refers to a device logically and possibly physically remote from the programming server. Although there might be many such mobile devices, they are generally referred to one at a time below, except where that might be confusing. As described below, in a preferred embodiment, the mo-bile device is associated with a vehicle and might be located within a wide range of possible locations. In those cases when a specific mobile device is selected for wireless programming, that one mobile device is sometimes referred to herein as the target device. There is no particular requirement for any predefined association between the mobile device and the vehicle. The mobile device might be manufactured with the vehicle, factory-installed in the vehicle, dealer-installed in the vehicle, installed in the vehicle as an after-market product, or simply carried in the vehicle without being attached thereto (such as for example in a glove box or trunk, or on a passenger seat).

(server) administrator—In general, this refers to an individual or other entity responsible for administering, scheduling, and performing wireless programming of the mobile device. There is no particular requirement that the server administrator is a single person; in some embodiments the server administrator might include multiple persons with the authority to act individually or collectively.

server device—In general, this refers to a device logically and possibly physically remote from the mobile device(s) and/or the server administrator. As described below, in a preferred embodiment, the server device is associated with a programming administrator. There is no particular requirement that the server device is a single hardware "device." In some embodiments, the server device might include multiple devices operating cooperatively (such as when networked) or might include a portion of one or more devices.

(wireless) programming—In general, this refers to sending control information from the server device to the mobile device. Wireless programming is also known as OTAP (over-the-air programming). As noted below, there is no particular requirement for the invention that "wireless" programming is actually wireless.

The scope and spirit of the invention is not limited to any of these definitions, or to specific examples mentioned therein, but is intended to include the most general concepts embodied by these and other terms.

System Elements

Figure 1:
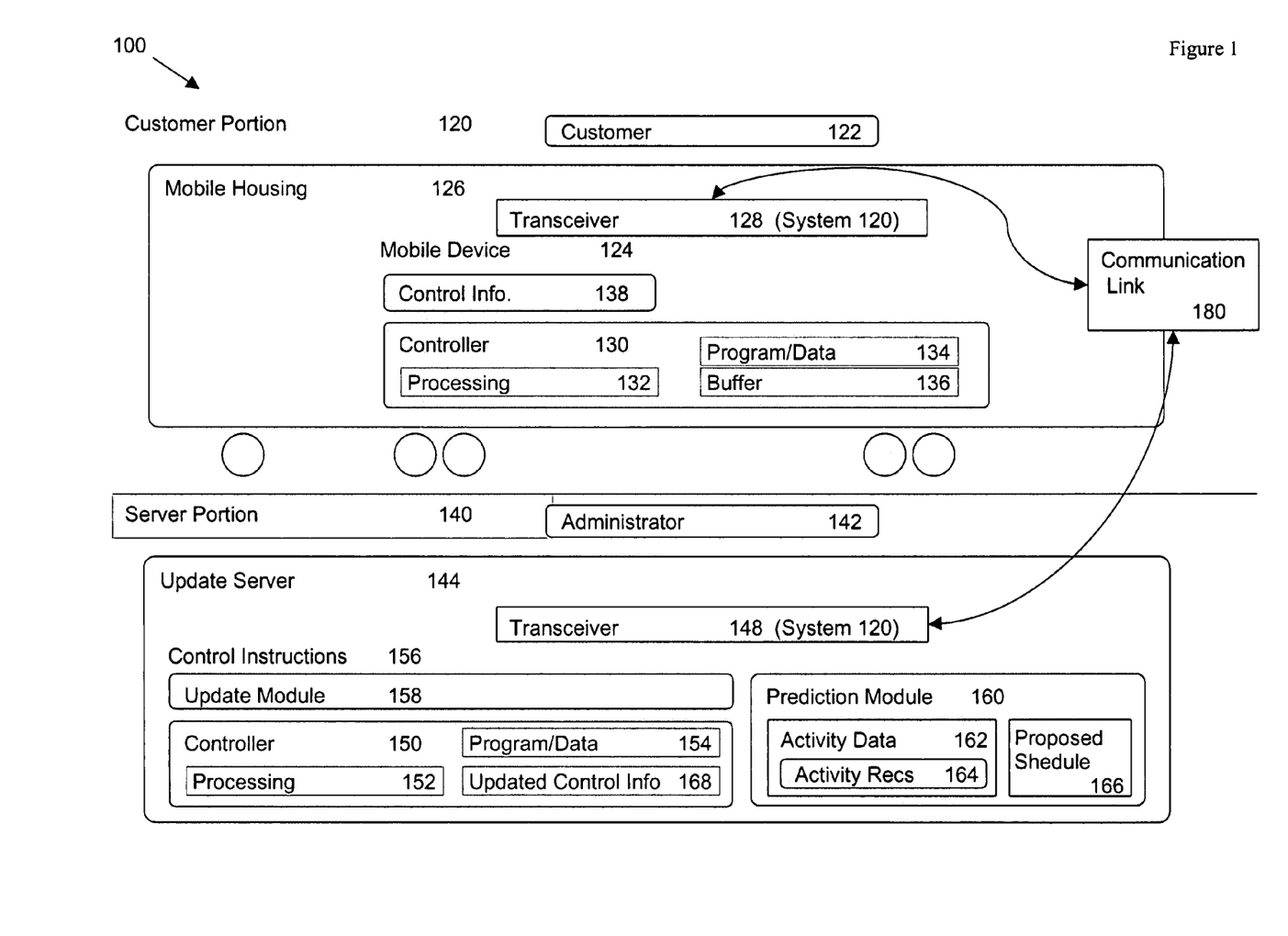
FIG. 1 shows a block diagram of a system including wireless programming of mobile devices.

FIG. 1 shows a block diagram of a system including wireless programming of mobile devices.

A system 100 includes a customer portion 120, a server portion 140, and a (wireless) communication link 180.

Customer Portion

The customer portion 120 refers generally to those aspects of the system 100 that are logically under control of, or otherwise associated with, a customer or other user. The customer might be an individual, a company, or another entity. In a preferred embodiment, where the customer is a company, the customer might include more than one person who interacts with the system 100 from time to time, such as both a driver of a vehicle carrying the mobile device and a dispatcher at a central station with whom the driver interacts.

In a preferred embodiment as described herein, the vehicle includes an automobile or truck. However, in alternative embodiments, the vehicle might be differ-ent, such as an airplane or other aircraft, boat or other marine vessel, railroad car, or other type of vehicle. There is also no particular requirement that all "vehicles" must be the same type; thus, a first vehicle might be a truck while a second vehicle (associated with the same customer) might be a hovercraft.

The customer portion 120 includes a customer 122 or other user and a mo-bile device 124. The mobile device 124 is preferably disposed in a mobile housing 126, such as a vehicle. (The vehicle might of course be any type of vehicle: a truck, an auto-mobile, a bicycle, a motorcycle, a scooter or skateboard, or any other type of wheeled vehicle, a boat or canoe or submarine or other marine vessel, a train, an airplane or helicopter or other aircraft, a sled, an elevator, or any other type of vehicle.) However, the concept of the invention is general enough to include systems 100 in which the mobile housing 126 is a hand-carried device, such as a pager, a PDA (personal digital assistant) or other handheld computer, a notebook or laptop computer, a telephone, a watch, a location or condition sensor, a biometric sensing or reporting device, a pacemaker, a telemetry device, or a remote homing device.

In a preferred embodiment, the mobile device 124 includes a transceiver 128, having an antenna, a receiver, and a transmitter. However, the concept of the invention is general enough to include systems 120 in which the mobile device 124 makes use of an attached transceiver, such as a cellular or satellite telephone, a radio transceiver, a microwave transceiver, a wireline modem, or any other device capable of communication with the server portion 140, on behalf of the mobile device 124, using the communication link 180.

In a preferred embodiment, the mobile device 124 includes a controller 130, having a processing element 132, program and data memory 134, and buffer memory 136.

The mobile device 124 operates under control of the processing element 132, which itself operates under control of selected control information 138, including instructions and selectable parameters, disposed in the memory 134.

The buffer memory 136 is coupled to the transceiver 128 and to the memory 134, and is disposed for receiving at least a portion of the control information 138 from the server portion 140 of the system 100 and for injecting that control information 138 into the memory 134.

Server Portion

The server portion 140 refers generally to those aspects of the system 100 that are logically under control of, or otherwise associated with, an administrator or other operator for updating the control information 138 at the mobile device 124. The administrator might be an individual, a company, or another entity. In a preferred embodiment, where the administrator is a company, the administrator might include more than one per-son who interacts with the system 100 from time to time, such as both an engineer who might alter the control information and a service administrator who might communicate with the customer about updating the control information 138.

The server portion 140 includes a server administrator 142 and an update server 144.

The update server 144 formulates data for sending by a transceiver 148, the transceiver 148 having an antenna, a receiver, and a transmitter. However, the concept of the invention is general enough to include systems 120 in which the update server 144 formulates data for sending by a detachable transceiver, such as a cellular or satellite telephone, a radio transceiver, a wireless or wireline modem, or any other device capable of communication with the server portion 140 using the communication link 180.

The update server 144 includes a controller 150, having a processing element 152, and program and data memory 154.

The update server 144 operates under control of the processing element 152, which itself operates under control instructions 156 (and selectable parameters) disposed in the memory 154. The instructions 156 include an update module 158 and a pre-diction module 160. The update module 158 is disposed for sending the updated control information 168 from the memory 154 to the transceiver 148, to send that updated control information 168 using the wireless communication link 180 to the mobile device 124.

The prediction module 160 is coupled to an activity database 162, including a set of activity records 164 relating to activity information about the mobile device 124. In a preferred embodiment, the activity records 164 are constructed from activity information received from the mobile device 124 from time to time, when the mobile device 124 reports its status and that of its associated vehicle 126. The prediction module 160 is disposed for reviewing the activity records 164 and for constructing a proposed schedule 166 for wireless programming of the mobile device 124.

Although in a preferred embodiment, the prediction module 160 determines the proposed schedule 166 for wireless programming of the mobile device 124, it is also possible that the update server 144 might, at the selected time for wireless programming, contact the mobile device 124 to determine if the mobile device 124 is in fact ready for wireless programming at that time. For example, the update server 144 might query the mobile device 124 for the latter's latest activity information and the latter's non-historical (that is, very recent) information regarding connection speed, communication protocol, location, and the like.

Wireless Communication Link

The wireless communication link 180 includes a communication network having at least one wireless communication path between the customer portion 120 and the server portion 140. In a preferred embodiment, the wireless communication path includes a wireless cellular or satellite telephone connection, such as might be available from a voice cellular or satellite telephone provider (in combination with a voice/data modem, to transmit data other than voice) or such as might be available from a data cel-lular provider or satellite data link.

Those skilled in the art will recognize, after perusal of this application, that the invention has no particular limitation to only wireless communication. The invention can be used with wireline communication, or with communication using a communication network that includes both wireless and wireline communication paths (and does not force communication to use either one). Although a preferred embodiment of the invention uses wireless communication, due to the mobile nature of the mobile devices to be programmed and their likely lack of connectivity using only wireline communication paths, there is no particular limitation of the nature of the invention to wireless only.

Method of Operation

Figure 2:
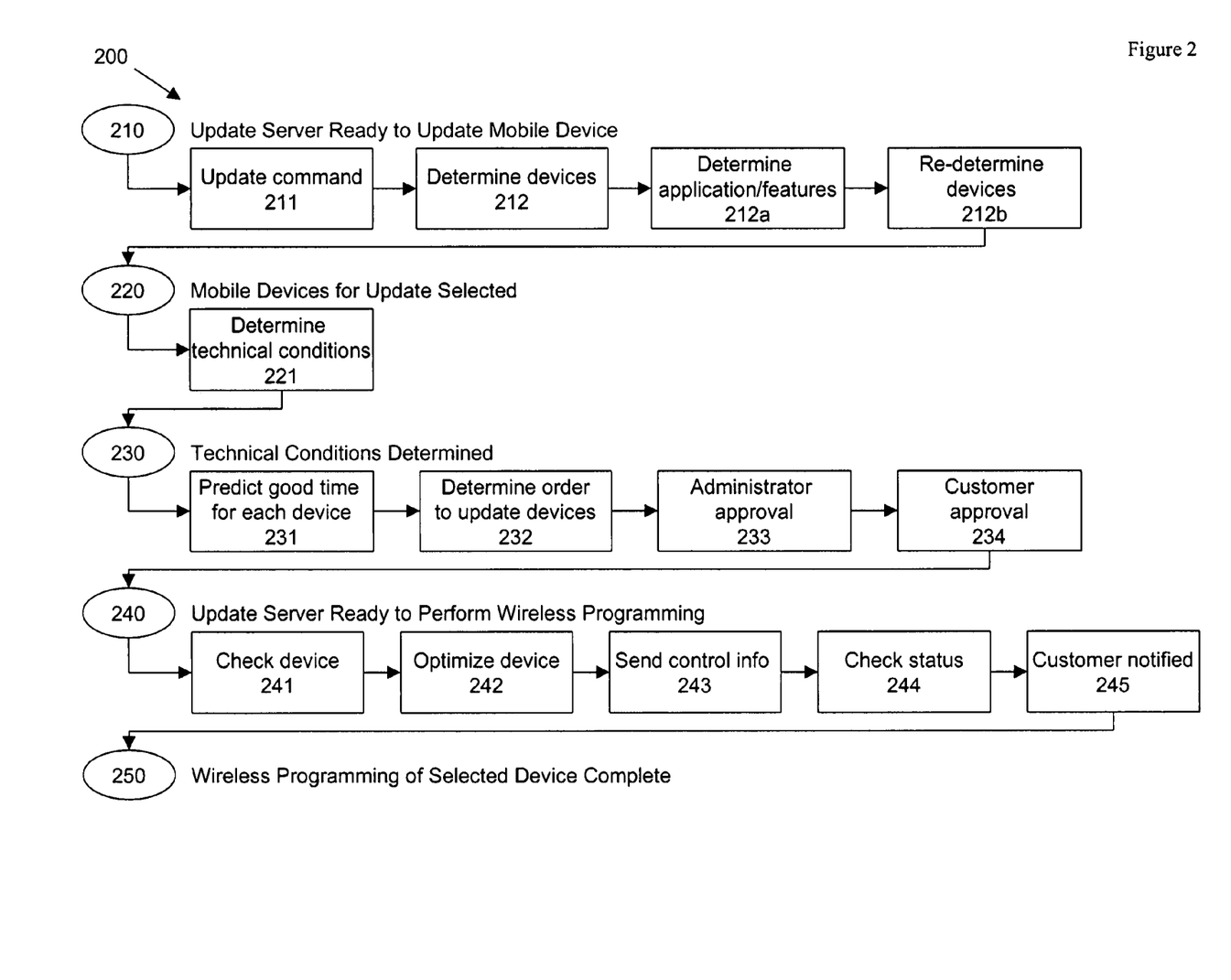
FIG. 2 shows a process flow diagram of a method including wireless programming of mobile devices.

FIG. 2 shows a process flow diagram of a method including wireless programming of mobile devices.

A method 200 is performed by the system 100. Although the method 200 is described serially, the flow points and steps of the method 200 can be performed by separate elements in conjunction or in parallel, whether asynchronously or synchronously, in a pipelined manner, or otherwise. There is no particular requirement that the method 200 must be performed in the same order in which this description lists flow points or steps, except where explicitly so indicated.

At a flow point 210, the update server 144 is ready to update mobile de-vices 124 with new control information 168.

At a step 211, the server administrator 142 issues a command to the update server 144 to update mobile devices 124 with updated control information 168. The command might be an explicit command, or might be an update to the activity database 162, indicating that updated control information 168 is available, which the update server 144 can send to mobile devices 124.

At a step 212, the update server 144 determines to which mobile devices 124 to send the updated control information 168. To perform this step, the update server 144 performs the following sub-steps:

At a sub-step 212a, the update server 144 identifies what application features or application programs are dependent, at least in part, on the updated control information 168. In a preferred embodiment, the update server 144 finds this information in the activity database 162. A result of this sub-step is a list of application features or application programs.

At a sub-step 212b, the update server 144 identifies which mobile devices 124 have the application features or application programs identified in the sub-step 212a. In a preferred embodiment, the update server 144 finds this information in the activity database 162. A result of this sub-step is a list of mobile devices 124.

Those skilled in the art will recognize, after perusal of this application, that the list of mobile devices 124 identified by this sub-step will typically include many, if not all, of the mobile devices 124 assigned to a particular customer 122. In a preferred embodiment, the update server 144 records its identification of these customers 122, so as to inform them of the updated control information 168. In preferred embodiments, the update server 144 might (responsive to commands from its operator) select groups of mobile devices 124 for wireless programming in response to groupings of those mobile devices 124: those in a selected geographic area or near a selected geographic location, those associated with a selected customer or a selected class of customers (such as a "premium" customer or a "discount" customer), and the like. Those skilled in the art will recognize, after perusal of this application, that grouping of mobile devices 124 to be selected for wireless programming can be quite flexible, and thus be made in response to many other factors not explicitly recited herein.

At a flow point 220, the update server 144 has identified which target mo-bile devices 124 to send the updated control information 168.

At a step 221, the update server 144 identifies what technical conditions are desired when sending the updated control information 168 to mobile devices 124. In a preferred embodiment, the update server 144 finds this information in the activity data-base 162, as placed there by the server administrator 142 or another entity, or queries the device using the communication link 180 to obtain status information or technical information about the mobile device 124. (It might occur that the mobile device 124 itself has the most current information about its status or its technical elements than is available in the activity database 162, possibly because the mobile device 124 has been updated in the field, or possibly because the activity database 162 is not current, or possibly because that information in the activity database 162 is not available at the time when this step is per-formed.)

In a preferred embodiment, these technical conditions might include
- a choice of locating or positioning technique used to determine a location for the target mobile device 124 (GPS is preferred, but alternatives include TDOA, AOA, AGPS, or some other technique);
- a minimum value of signal strength received by the target mobile device 124;
- a minimum amount of idle time to be used by the process of updating the control information 138 at the target mobile device 124; and
- any financial or administrative constraints on the process of updating the control information 138 at the target mobile device 124 (such as for example a maximum wireless communication charge).

As part of this step, the update server 144 identifies what transmission technique, including (if more than one is available) a transmission protocol and (if more than one is available) a communication path, is desired when sending the updated control information 168 to mobile devices 124.

In a preferred embodiment, the transmission technique might be selected in response to conditions such as
- administrative requirements, such as minimized cost or maximized reliability within a selected period of time, or such as security of transmission, and the like;
- characteristics of the updated control information 168, such as its length, its sensitivity to error, and the like;
- suitability or quality of the transmission technique for wireless programming, whether in general or for the particular selected updated control information 168;
- signal strength or other characteristics of the signal, such as possibly noise or other interference, the spectrum for noise or other interference, and whether such noise or other interference is bursty or random, and the like.

At a flow point 230, the update server 144 has identified what technical conditions are desired when sending the updated control information 168 to mobile de-vices 124.

At a step 231, the update server 144 determines, for each target mobile de-vice 124, a prediction of future occurrence of all, or a minimum set of, such conditions, including analysis of that prediction regarding to what extent those conditions are satisfied, and which times would provide the best predicted probability of a successful wireless programming operation. A preferred method of performing this step is described with reference to FIG. 3.

At a step 232, the update server 144 determines in what order to update the target mobile devices 124. There is no particular requirement that the update server 144 choose any particular order. However, in a preferred embodiment, the update server 144 might select the order to update the target mobile devices 124 in response to one or more of, or some combination of, these factors:
- a probability of success for the wireless programming operation, so that for example the target mobile devices 124 are selected to maximize a number of successfully completed wireless programming operations during a selected time duration;
- a time order of the earliest available window for the wireless programming operation, so that for example the target mobile devices 124 are selected to minimize an expected amount of time between scheduling and actual performance of the wireless programming operation;

an amount of data to be sent during the wireless programming operation, so that for example a relatively larger number of target mobile devices 124 might have their wireless programming operation performed first if that wireless programming operation is relatively quick;

a cost of the wireless programming operation, so that for example a total cost of wireless programming is substantially minimized; and a request by the customer associated with the target mobile devices 124, so that for example perceived responsiveness to the customer request is optimized;

Those of ordinary skill would recognize, after perusal of this application, that the operation of scheduling for any particular target mobile device 124, and the operation of actually performing wireless programming for that particular target mobile device 124, need not be the same order. Moreover, those of ordinary skill would recognize, after perusal of this application, that the operation of sending the updated control information 168 to the target mobile device 124, and the operation of injecting and executing that updated control information 168, also need not be the same order.

The next step is optional, and may be omitted in a preferred embodiment.

At an (optional) step 233, the update server 144 presents its update schedule to the server administrator 142 and requests approval. If the server administrator 142 approves, the method 200 proceeds with the next step. If the server administrator 142 disapproves, the method 200 returns to the flow point 230 to determine a revised schedule.

If the update server 144 is unable to find an acceptable schedule, it presents a signal to the administrator 142 and receives a suggested schedule from the administrator 142. In a preferred embodiment, the administrator 142 will likely contact the customer 122 and negotiate an acceptable schedule.

In alternative embodiments, the contact with the customer 122 may be automatically generated and performed, such as for example by sending a pre-formatted email message. The pre-formatted email message may query the customer 122 for times when the desired conditions would be present, and allow the customer to reply using a machine-readable format. Instead of an email message, a link to a web site using an HTTP "post" technique may be used. If automatic contact is unsuccessful, the administrator 142 may then contact the customer 122 and negotiate an acceptable schedule.

The next step is optional, and may be omitted in a preferred embodiment.

At an (optional) step 234, the update server 144 presents its update schedule to the customer 122 and requests approval. If the customer 122 approves, the method 200 proceeds with the next step. If the customer 122 disapproves, the method 200 returns to the flow point 230 to determine a revised schedule.

If the update server is unable to find an acceptable schedule (that is, one that is acceptable to both the server portion 140 and optionally to the customer 122), it presents a signal to the administrator 142 and receives a suggested schedule from the administrator 142. In a preferred embodiment, the administrator 142 will likely contact the customer 122 and negotiate an acceptable schedule.

At a flow point 240, the update server 144 is ready to perform wireless programming using the schedule.

At a step 241, the update server 144 selects an individual mobile device 124 (for which it has been predicted that the desired conditions are present) and determines if that mobile device 124 is ready to receive new control information 168.

In a preferred embodiment, the update server 144 contacts the mobile device 124, queries the latter's state, and compares that state against its set of desired conditions. If a minimum set of desired conditions is not met, the update server 144 concludes that the mobile device 124 is not ready, and the mobile device 124 is rescheduled for another time (at other steps in the method 200).

At a step 242, the update server 144 directs the mobile device 124 to adjust its parameters (if required) to optimize receipt of updated control information 168. If the parameters for the mobile device 124 are already optimized, there is no particular requirement to adjust them. In a preferred embodiment, these parameters might include a control parameter for power management, such as a power management timer (sometimes called a "sleep time") for the mobile device 124 to remain powered-up but inactive.

At a step 243, the update server 144 sends new control information 168 to the mobile device 124. The mobile device 124 receives the new control information 168 and records it in its buffer memory 136. As part of this step, the update server 144 waits for the mobile device 124 to acknowledge successful receipt of the new control information 168. If successful receipt is not acknowledged on a first try, this step is repeated until the new control information 168 is successfully received. Although not described in detail herein, it would be clear to those skilled in the art, after perusal of this application, to include a retry-count or timeout provision so that this step is not repeated continually for too long.

At a step 244, the update server 144 directs the mobile device 124 to inject the new control information 168 from its buffer memory 136 into its program and data memory 134. As part of this step, the update server 144 waits for the mobile device 124 to acknowledge success. If success is not acknowledged on a first try, this step is repeated until the new control information 168 is successfully injected from the buffer memory 136 into the program and data memory 134. Although not described in detail herein, it would be clear to those skilled in the art, after perusal of this application, to include a retry-count or timeout provision so that this step is not repeated continually for too long.

At a step 245, the update server 144 directs the mobile device 124 to report its status. As part of this step, the update server 144 waits for the mobile device 124 to report a quiescent status. If the mobile device 124 does not report a quiescent status on the first try, this step is repeated until the mobile device 124 reports successfully.

If the update server 144 is unable to cause the mobile device 124 to report successfully, it returns to the flow point 240 and re-attempts the wireless programming operation.

If the update server 144 is unable to successfully perform the wireless programming operation after multiple tries, it presents a signal to the administrator 142 and waits for the administrator 142 to reset the mobile device 124 by another means. In a preferred embodiment, the administrator 142 will likely contact the customer 122 and cause the mobile device 124 to be reset in person.

The next step is optional, and may be omitted in a preferred embodiment.

At an (optional) step 246, the update server 144 presents a signal to the customer 122 to the effect that it was successful at wireless programming of the mobile device 124.

At a flow point 250, the update server 144 has completed wireless programming of the selected mobile device 124. In a preferred embodiment, the update server 144 repeats the steps of the method 200 with regard to each mobile device 124 to be programmed.

In a preferred embodiment, the update server 144 batches multiple mobile devices 124 for concurrent scheduling and wireless programming.

For example, in a preferred embodiment, the update server 144 collects all mobile devices 124 associated with a single customer 122 for concurrent scheduling, so that the customer 122 can approve or reject the proposed schedules in a single message (or a relatively small number of messages).

Similarly, in a preferred embodiment, the update server 144 collects all mobile de-vices 124 associated with a single customer 122 for concurrent wireless programming, so that the mobile devices 124 can be programmed in a group substantially in parallel.

For example, the update server 144 can initiate programming for a first selected mobile device 124 in the group, then for a second selected mobile device 124 shortly thereafter (perhaps 30 seconds later), and so on, so that programming for the entire group can be performed in less time than if the mobile devices 124 were individually programmed serially. Thus, if it takes 10 minutes to program an individual mobile device 124, a set of 60 such mobile devices 124 could be programmed in about 40 minutes (30 minutes delay from start of the first mobile device 124 to start of the last mobile device 124, plus 10 minutes programming time for the last mobile device 124), rather than in about 10 hours (10 minutes each times 60 separate mobile devices 124).

Method of Scheduling Preferred Times

Figure 3:
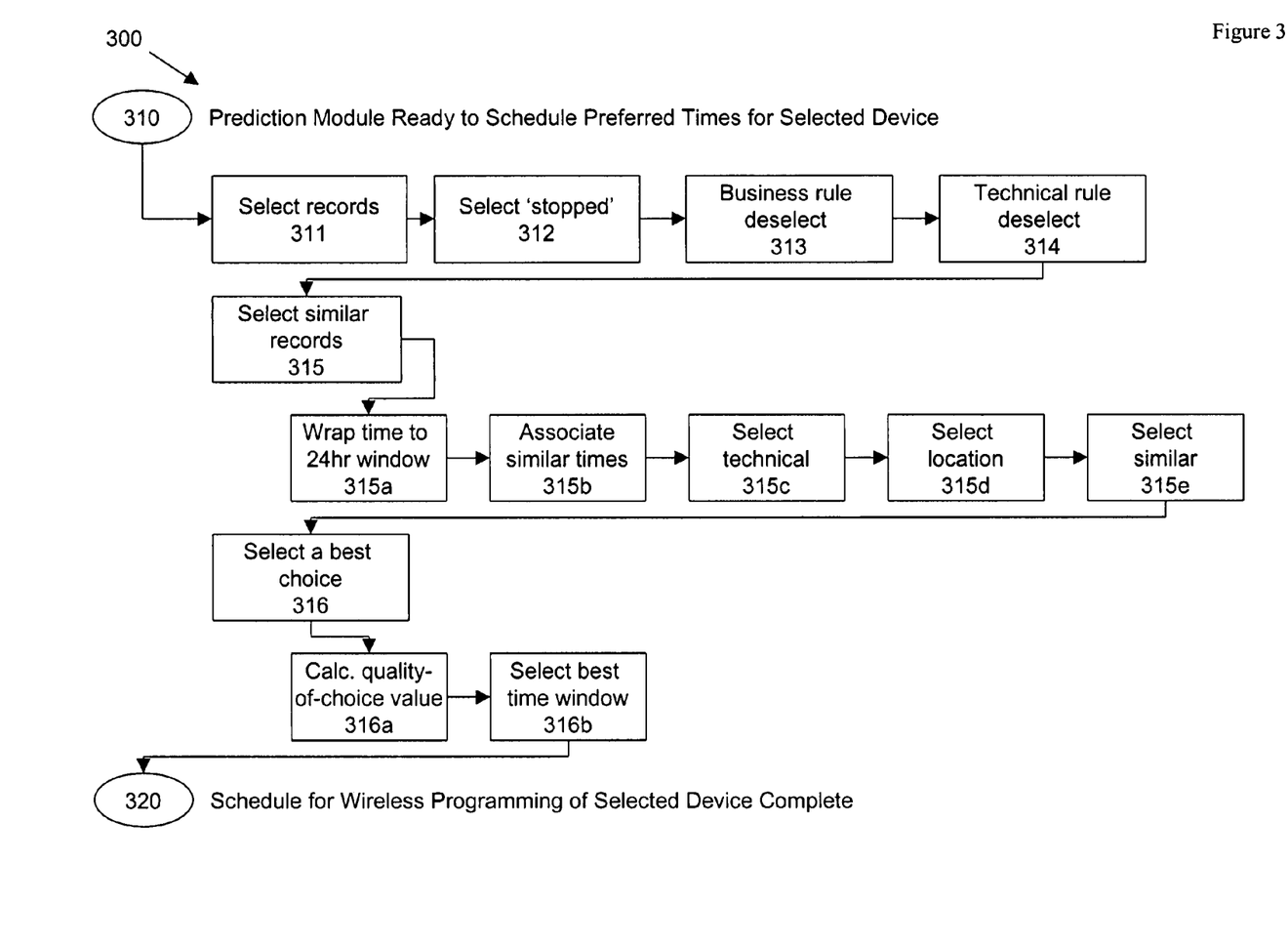
FIG. 3 shows a process flow diagram of a method including prediction of preferred times for wireless programming of mobile devices.

FIG. 3 shows a process flow diagram of a method including prediction of preferred times for wireless programming of mobile devices.

A method 300 is performed by the prediction module 160. Although the method 300 is described serially, the flow points and steps of the method 300 can be per-formed by separate elements in conjunction or in parallel, whether asynchronously or synchronously, in a pipelined manner, or otherwise. There is no particular requirement that the method 300 must be performed in the same order in which this description lists flow points or steps, except where explicitly so indicated.

At a flow point 310, the prediction module 160 is ready to schedule a set of preferred times for wireless programming of the selected target mobile device 124.

At a step 311, the prediction module 160 (working with the recent records from the activity database 162) selects those records that refer to the target mobile device 124.

At a step 312, the prediction module 160 (working with a result of the previous step) selects those records that refer to a "stopped" condition. In a preferred embodiment, it is desirable that the vehicle 126 is stopped, that is, not moving or operating. In a preferred embodiment, "stopped" generally refers to a relatively continuous time duration, such when the vehicle 126 is actually parked. Although a parked vehicle 126 is preferred, there is no particular requirement therefor; the invention includes those embodiments in which the vehicle 126 is considered stopped in a number of other conditions, such as if it is parked with the motor running, stopped and idling, stopped at a traffic light or stop sign, and the like. In alterative embodiments, it may be acceptable for the vehicle 126 (or other package in which the mobile device 124 is disposed or deployed) to be in a differently defined state, such as "idle", "off", "quiescent", or even to be in a relatively active state that does not interfere with wireless programming, such as if the mobile device 124 is merely running diagnostics.

At a step 313, the prediction module 160 (working with a result of the previous step) applies business rules to de-select unlikely records. In a preferred embodiment, the business rules are designed to discard those activity records 164 corresponding to cases unlikely (for business reasons) to be "true" quiescent states of the vehicle 126. For example, the business rules might include the following Only include those activity records 164 corresponding to times outside normal business hours (such as for example, 9:00 a.m. to 5:00 p.m.).

Only include those activity records 164 corresponding to locations at or near the parking facility where the vehicle 126 is parked overnight.

Exclude those activity records 164 corresponding to locations outside the normal operational area of the vehicle 126.

Those skilled in the art would recognize, after perusal of this application, that this set of business rules is only exemplary. There is no particular requirement that the invention is limited to this exemplary set.

At a step 314, the prediction module 160 (working with a result of the previous step) applies technical rules to de-select unacceptable records. In a preferred embodiment, the technical rules are designed to discard those activity records 164 corresponding to cases unlikely (for technical reasons) to be "true" quiescent states of the vehicle 126. For example, the business rules might include the following Require a "stopped" time of at least 30 minutes.

Require a minimum signal strength, for the entire "stopped" time, of at least 30 db (decibels) more than the minimum programming signal strength.

Those skilled in the art would recognize, after perusal of this application, that this set of technical rules is only exemplary. There is no particular requirement that the invention is limited to this exemplary set.

At a step 315, the prediction module 160 (working with a result of the previous step) applies a goodness-of-match technique to select records that are sufficiently similar.

To perform this step, the prediction module 160 performs the following sub-steps.

At a sub-step 315a, the prediction module 160 wraps the time associated with each activity record 164 to a 24-hour periodic time window.

At a sub-step 315b, the prediction module 160 (working with a result of the previous sub-step) associates those activity records 164 having similar time values (that is, time values within an error parameter $e_t$). In a preferred embodiment, the parameter $e_t$ is selected to be less than about 15 minutes.

At a sub-step 315c, the prediction module 160 (working with a result of the previous sub-step) selects those activity records 164 that meet the technical requirements noted with regard to the step 314 (minimum stop time, minimum signal strength).

At a sub-step 315d, the prediction module 160 (working with a result of the previous sub-step) selects those activity records 164 that have a similar location (that is, location within an error parameter $e_s$). In a preferred embodiment, the parameter $e_s$ is measured using a rectilinear distance (that is, a maximum of north-south distance and east-west distance) and is selected to be less than about 1 city block.

At a sub-step 315e, the prediction module 160 (working with a result of the previous sub-step) selects those activity records 164 that have a similarity count (that is, a number of records that are similar for a selected time window within the 24-hour time period) that is similar enough for prediction (that is, greater than a selected threshold parameter T). In a preferred embodiment, the threshold parameter T is selected to be greater than about 50% of the time.

At a step 316, the prediction module 160 (working with a result of the previous step) selects a best choice from among those available choices of sets of time windows.

To perform this step, the prediction module 160 performs the following sub-steps.

At a sub-step 316a, the prediction module 160 calculates a quality-of-choice value in response to selected business and technical parameters. In a preferred embodiment, these business and technical parameters include A length of the stop time associated with the activity records 164 (a longer stop time is better).

A time of day for the activity records 164 (a time of day after business hours is better).

An off-peak or on-peak value associated with the time of day (off-peak hours are better because they are typically less expensive for wireless communication).

A home-system or roaming value associated with the location for the activity records 164 (a home-system value is better because it is typically less expensive for wireless communication).

Those skilled in the art would recognize, after perusal of this application, that this set of business and technical parameters is only exemplary. There is no particular requirement that the invention is limited to this exemplary set.

At a sub-step 316b, the prediction module 160 selects the time window with the best calculated quality-of-choice value.

At a flow point 320, the prediction module 160 has completed scheduling a set of preferred times for wireless programming of the selected target mobile device 124.

ALTERNATIVE EMBODIMENTS

Although preferred embodiments are disclosed herein, many variations are possible which remain within the concept, scope, and spirit of the invention. These variations would become clear to those skilled in the art after perusal of this application.

The invention applies to any control information to be used with or injected into the mobile device 124, not just to firmware programming. However, in a preferred embodiment, the invention is primarily used for firmware programming of mobile devices 124.

The invention applies to any mobile device 124, not just to those disposed in vehicles 126. However, in a preferred embodiment, the invention is primarily used for mobile devices 124 disposed in vehicles 126 having GPS location apparatus and capable of reporting their position from time to time (such as periodically or in response to a query from a server associated with the administrator 142). There is no particular limitation of the invention to GPS location; for example, the invention can also use position information obtained by cellular triangulation data.

The invention applies to data mining for other facts regarding activity records 164 for mobile devices 124, not just to those windows of time when the mobile devices 124 are best programmed. The following possibilities are exemplary.

The invention can be used to determine those areas of low signal strength, in response to signal strength information (and signal outages) found in activity records 164 and correlated with selected position information.

The invention can be used to determine those areas where mobile devices 124 should change carriers for wireless communication, in response to signal strength information (and signal outages), position information, and wireless carrier cost information.

The invention can be used to alert customers 122 to those vehicles 126 likely to become unavailable for wireless communication, in response to signal strength information (and signal outages) and position information.

The invention can be used to inform customers 122 of likely locations for those vehicles 126 that are unavailable for wireless communication, in response to his-toric areas of low signal strength (or no signal) and recent position information for those vehicles 126.

The invention applies to predicting or selecting conditions related to operation of any client-server relationship. The following possibilities are exemplary.

There is no particular requirement that the client (in a client-server relationship) is actually a mobile device, or that the client device is coupled to the server using a wireless communication link. For a first example, the client-server relationship can involve an internet connection between a web browser and a web server, with some number of intervening routing or switching devices. For a second example, the client-server relationship can involve an internet connection between an application program and an upgrade server, where the upgrade server provides bug-fixes, upgrades, or other information to the application program. If the application program were a virus-checking program, the update information could include information about new viruses.

There is no particular requirement that the server (in a client-server relationship) is the one to initiate the programming (or other download). For example, the client, referred to herein as the mobile device, might initiate the transaction by telling the server it needs some information. The server (having determined that downloading the information would take awhile) could respond by telling the client the requested information would arrive, select when, and so inform the client. As part of initiating the transaction, the client might also propose a set of preferred times for wireless programming, or other information that might assist the server in selecting the actual time wireless programming is conducted.

There is no particular requirement that the primary information path is from the server to the client (in a client-server relationship). For a first example, in addition to wireless programming, techniques shown herein could be used for requesting information to be sent from the client to the server, instead of or in addition to the other way around. Thus, wireless programming can include also over-the-air status requests by the server. For a second example, the server could send to the client a diagnostic program for examining or testing the client, so that the program could send results back to the server, even if the diagnostic program is not persistently retained at the client.

Those skilled in the art will recognize, after perusal of this application, that these alternative embodiments are illustrative and in no way limiting.

What is claimed is:

1. A method including operating a computer to examine activity information for a mobile device disposed in a vehicle;

in response to said activity information, operating the computer to predict a time when the vehicle is stopped for wireless programming of said mobile device; and
programming said mobile device at the predicted time.

2. A method as in claim 1, including automatically reporting said programming operation to a customer associated with said mobile device.

3. A method as in claim 1, including gathering said activity information in response to a set of reports from said mobile device.

4. A method as in claim 1, including obtaining approval from a customer associated with said mobile device for the predicted time.

5. A method as in claim 1, wherein said steps of programming include
sending control information to said mobile device;
buffering said control information at said mobile device; and
injecting said control information from a buffer to a program or data memory at said mobile device.

6. A method as in claim 1, wherein said steps of operating include
accessing said activity information in a database; and
selecting records from said database in response to a set of matching conditions.

7. A method as in claim 6, wherein said matching conditions include
a set of business rules relating to expected human behavior associated with said mobile device; or
a set of technical rules relating to desired physical behavior associated with an operation of programming said mobile device.

8. Apparatus including
means for operating a computer to examine activity information for a mobile device disposed in a vehicle;
means for operating the computer in response to said activity information to predict a time when the vehicle is stopped for wireless programming of said mobile device; and
means for programming said mobile device at the predicted time.

9. Apparatus as in claim 8, including means for automatically reporting said programming operation to a customer associated with said mobile device.

10. Apparatus as in claim 8, including means for gathering said activity information in response to a set of reports from said mobile device.

11. Apparatus as in claim 8, including means for obtaining approval from a customer associated with said mobile device for the predicted time.

12. Apparatus as in claim 8, wherein said means for programming include
means for sending control information to said mobile device;
means for buffering said control information at said mobile device; and
means for injecting said control information from a buffer to a program or data memory at said mobile device.

13. Apparatus as in claim 8, wherein said means for operating include
means for accessing said activity information in a database; and
means for selecting records from said database in response to a set of matching conditions.

14. Memory or mass storage including instructions capable of being interpreted by a computing device to
examine activity information for a mobile device disposed in a vehicle;
in response to said activity information, predict a time when the vehicle is stopped for wireless programming of said mobile device; and
program said mobile device at the predicted time.

15. Memory or mass storage as in claim 14, including instructions capable of being interpreted by a computing device to report performance of said instructions to program to a customer associated with said mobile device.

16. Memory or mass storage as in claim 14, including instructions capable of being interpreted by a computing device to gather said activity information in response to a set of reports from said mobile device.

17. Memory or mass storage as in claim 14, including instructions capable of being interpreted by a computing device to obtain approval from a customer associated with said mobile device for the predicted time.

18. Memory or mass storage as in claim 14, wherein said instructions to program include instructions capable of being interpreted by a computing device to
send control information to said mobile device;
buffer said control information at said mobile device; and
inject said control information from a buffer to a program or data memory at said mobile device.

19. Memory or mass storage as in claim 14, wherein said instructions to examine include instructions capable of being interpreted by a computing device to
access said activity information in a database; and
select records from said database in response to a set of matching conditions.

20. In a client-server relationship, a method including
examining activity information associated with a mobile client, said activity information including a set of records of data associated with said client for a plurality of times;
in response to said activity information, predicting a time for sending program information to said client such that signal strength of a wireless signal carrying server information to the client is above a minimum value; and
substantially at the predicted time, sending said program information from a server to said client.

21. A method as in claim 20, including receiving said activity information from said client.

22. A method as in claim 20, wherein said activity information includes whether said client is in a state suitable for receiving said program information.

23. A method as in claim 20, including receiving a request from said client, said request being interpretable at said server to indicate that said client needs at least some of said program information.

24. A method as in claim 20, including
sending schedule information regarding the predicted time to said client; and
confirming said schedule information with said client.

25. A method as in claim 20, wherein
said client-server relationship includes an internet connection to a web server; and
said program information includes at least one of: an operating system bug-fix or upgrade, an application program bug-fix or upgrade, operating data for an operating system or an application program.

26. A method as in claim 25, wherein said program information includes a set of information about viruses.

27. A method as in claim 20, wherein said program information includes a set of instructions to be executed at said client.

28. A method as in claim 27, including
generating a result of performing said instructions at said client; and
sending said result to said server.

29. A method as in claim 27, including
sending to said server a result of processing said program information at said client; and
removing said program information from said client.

30. Apparatus including
means for examining activity information associated with a client associated with a client-server relationship, said activity information including a set of records of data associated with said client for a plurality of times;
means for predicting a time for sending program information to said client in response to said activity information such that signal strength of a wireless signal carrying server information to the client at the predicted time is above a minimum value; and
in response to said activity information sending said program information from a server to said client substantially at the predicted time.

31. Apparatus as in claim 30, including means for receiving said activity information from said client.

32. Apparatus as in claim 30, including means for receiving a request from said client, said request being interpretable at said server to indicate that said client needs at least some of said program information.

33. Apparatus as in claim 30, including
means for sending schedule information regarding the predicted time to said client; and
means for confirming said schedule information with said client.

34. Apparatus as in claim 30, wherein
said client-server relationship includes an internet connection to a web server; and
said program information includes at least one of: an operating system bug-fix or upgrade, an application program bug-fix or upgrade, operating data for an operating system or an application program.

35. Apparatus as in claim 34, wherein said program information includes a set of information about viruses.

36. Apparatus as in claim 30, wherein said program information includes a set of instructions to be executed at said client.

37. Apparatus as in claim 36, including
means for generating a result of performing said instructions at said client; and
means for sending said result to said server.

38. Apparatus as in claim 36, including
means for sending to said server a result of processing said program information at said client; and
means for removing said program information from said client.

39. In a client-server relationship, memory or mass storage including instructions capable of being interpreted by a computing device to
examine activity information associated with the client, said activity information including a set of records of data associated with said client for a plurality of times;
predict a time for sending program information to said client in response to said activity information, such that signal strength of a wireless signal carrying server information to the client is expected to be above a minimum value; and
send said program information from the server to said client substantially at the predicted time.

40. Memory or mass storage as in claim 39, including instructions capable of being interpreted by a computing device to receive said activity information from said client.

41. Memory or mass storage as in claim 39, wherein said activity information includes whether said client is in a state suitable for receiving said program information.

42. Memory or mass storage as in claim 39, including instructions capable of being interpreted by a computing device to receive a request from said client, said request being interpretable at said server to indicate that said client needs at least some of said program information.

43. Memory or mass storage as in claim 39, including instructions capable of being interpreted by a computing device to
send schedule information regarding the predicted time to said client; and
confirm said schedule information with said client.

44. Memory or mass storage as in claim 39, wherein
said client-server relationship includes an internet connection to a web server; and
said program information includes at least one of: an operating system bug-fix or upgrade, an application program bug-fix or upgrade, operating data for an operating system or an application program.

45. Memory or mass storage as in claim 44, wherein said program information includes a set of information about viruses.

46. Memory or mass storage as in claim 39, wherein said program information includes a set of instructions to be executed at said client.

47. Memory or mass storage as in claim 46, including instructions capable of being interpreted by a computing device to
generate a result of performing said instructions at said client; and
send said result to said server.

48. Memory or mass storage as in claim 46, including instructions capable of being interpreted by a computing device to
send to said server a result of processing said program information at said client; and
remove said program information from said client.

49. A method of programming a mobile client device from a server device, the method comprising:
examining, at the server device, activity information of the mobile device;
identifying, at the server device, one or more desired technical conditions for sending programming information from the server device to the mobile device, each of the one or more desired technical conditions affecting probability of a successful programming operation of the mobile client device;
predicting one or more future occurrences of at least a minimum set of the desired technical conditions;
selecting at least one of the predicted future occurrences as a time for programming the mobile device; and
operating the server device to send programming information to the mobile device substantially at the selected time.

50. A method as in claim 49, wherein the one or more desired technical conditions comprise a minimum value of signal strength received by the mobile client device.

51. A method as in claim 49, wherein the one or more desired technical conditions comprise a minimum amount of idle time to be used for updating control information at the mobile client device.

52. A computer-implemented method, comprising:

obtaining a set of activity records of a mobile device disposed in a vehicle;

applying rules to discard, from the set of activity records, activity records that are unlikely to correspond to times when the vehicle is stopped;

based on the records remaining in the set of activity records after the step of applying, predicting a time when the vehicle is stopped for wireless programming of said mobile device; and programming said mobile device at the predicted time.

* * * * *